United States Patent [19]

Yanez

[11] Patent Number: 4,883,333

[45] Date of Patent: Nov. 28, 1989

[54] INTEGRATED, SOLID, OPTICAL DEVICE

[76] Inventor: Serge J. Yanez, 25395 Pine View Dr., Colfax, Calif. 95713

[21] Appl. No.: 106,650

[22] Filed: Oct. 13, 1987

[51] Int. Cl.$^4$ ............................................. G02B 6/00
[52] U.S. Cl. ............................. 350/96.10; 350/96.15; 350/96.18; 350/96.19; 350/320; 362/32
[58] Field of Search ............... 350/96.10, 96.15, 96.18, 350/96.19, 96.24, 320, 321; 362/32; 250/227

[56] References Cited

U.S. PATENT DOCUMENTS

| | | | |
|---|---|---|---|
| 3,437,804 | 4/1969 | Schaefer et al. | 362/32 |
| 4,106,078 | 8/1978 | Inoue | 362/32 |
| 4,234,907 | 11/1980 | Daniel | 362/32 |
| 4,302,069 | 11/1981 | Niemi | 350/96.15 |
| 4,459,642 | 7/1984 | Mori | 362/32 |
| 4,460,939 | 7/1984 | Murakami et al. | 362/32 |
| 4,500,167 | 2/1985 | Mori | 350/96.24 |
| 4,528,617 | 7/1985 | Blackington | 362/32 |
| 4,585,298 | 4/1986 | Mori | 350/96.1 |
| 4,615,579 | 10/1986 | Whitehead | 350/96.1 |
| 4,693,552 | 9/1987 | Jeskey | 350/96.24 |
| 4,693,556 | 9/1987 | McCaughan, Jr. | 350/320 |

Primary Examiner—William L. Sikes
Assistant Examiner—Frank González
Attorney, Agent, or Firm—Bernhard Kreten

[57] ABSTRACT

A solid optical device for the generation and distribution of radiant energy from 0.3 microns to greater than 10 microns. The device is a system comprising a radiant energy generating solid optical reflector, a radiant energy conducting solide channel and a radiant energy distributing solid luminaire. The optical reflector and luminaire are each composites of various optical elements, of different optical materials, integrated into various solid forms. A radiant energy transmitting solid channel is interposed and integrated between optical reflector and luminaire for means of conducting radiant energy from reflector to luminaire for means of dispersing energy into various patterns.

23 Claims, 3 Drawing Sheets

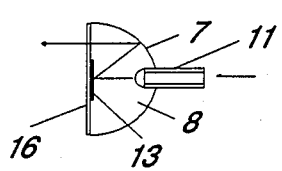
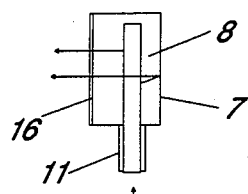
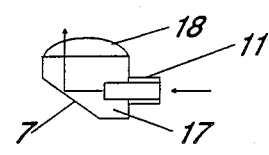
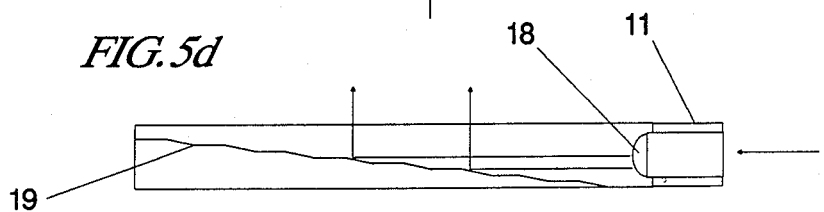
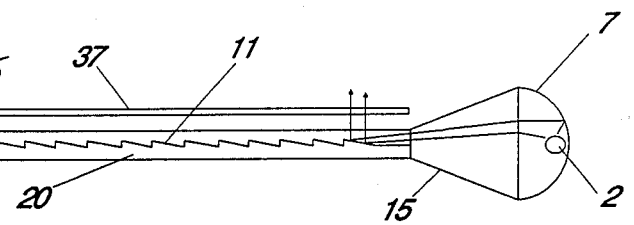
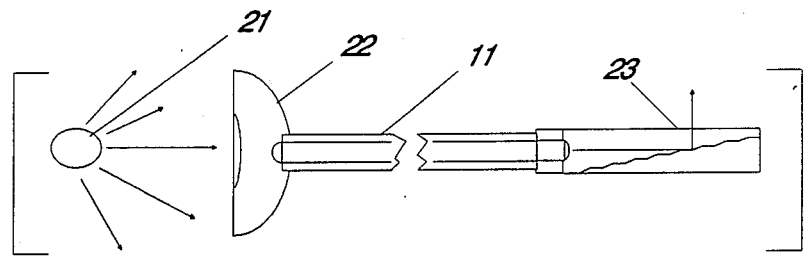
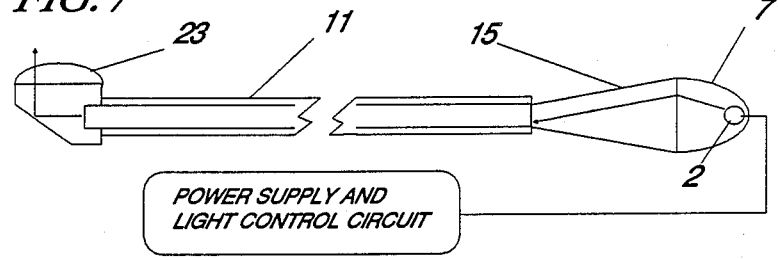

INTEGRATED, SOLID, OPTICAL DEVICE

FIELD OF INVENTION

The present invention relates to a new form of optical system for the collection, transmission and controlled emission of radiant energy from 0.3 microns to greater than 10 microns. This new form of optical system employs reflective and refractive optical elements which are not air-spaced or inter-dependent upon precise mechanical alignment as in most conventional systems. Instead, the optical elements used in this new optical system employ the properties of optical materials to eliminate air-spacing and confine energy trans-mission to reduce losses. In this new optical system lenses and reflectors, constructed of different materials, are integrated into a single optical element void of air spaces, including the radiant energy source. This composite of optical elements, bonded or fused together, use the material refractive properties of adjacent elements to achieve direct optical coupling and therein eliminate the need for mechanical alignment.

BACKGROUND OF INVENTION

The following citations reflect the state of the art of which the applicant is aware insofar as they appear to be germane to the patent process.

U.S. Pat. No. 3,497,981 Tyne
U.S. Pat. No. 3,770,338 Helmuth
U.S. Pat. No. 3,549,878 Baily
U.S. Pat. No. 4,523,257 Mori
U.S. Pat. No. 4,471,412 Mori
U.S. Pat. No. 4,422,719 Orcutt
U.S. Pat. No. 4,106,078 Inoue
U.S. Pat. No. 4,561,043 Thompson
U.S. Pat. No. 4,234,907 Daniel
U.S. Pat. No. 3,790,775 Rosenblatt
U.S. Pat. No. 3,429,157 Myles Optical design technology for generating intense visible radiant energy and its transmission through rigid or flexible light pipe optical devices is well known. An optical illumination system designed to generate intense visible light suitable for transmission through a light pipe typically consists of an illuminator, a light pipe and a luminaire. A simple illuminator might consist of a source of light placed at the focal point of a lens or reflector. However, more efficient illuminators generally consist of an ellipsoidal mirror, a light source, a refractive condenser lens, projection lens and heat removing filter. The light pipe, a fiber optics cable, is located at the image plane of the light source. Because of the small numerical aperture of the fiber optics, the illuminator must produce a very small uniformly bright image on the face of the fiber optics to achieve the maximum transfer of energy. The luminaire is placed at the energy discharge end of fiber optics cable. The luminaire will consist of one or more lenses arranged to produce the desired dispersion or concentration of light. Sources of radiant energy used in illuminators include arc-discharge lamps, glow-discharge lamps and incandescent lamps. All the optical components are interdependent upon precise optical alignment and are separated by air or dry nitrogen gas. The optical designer must also include the transmission properties of the air or gas in the design of the system, which include the losses and effects introduced by absorption. Once the performance of the system is optimized other equally important requirements must be satisfied. Included in these requirements is the assurance of long term stability in optical alignment, removal of heat and protection against environmental contaminants. To satisfy these requirements often results in the use of costly precision mechanical fittings, additional optical components and a device for removing heat. Often the most costly is the inclusion of the environmental proof housing to protect the delicate optical surfaces. This is one reason why certain forms of optical illuminating devices are both expensive and heavy. There exists a need for a new form of optical illumination system which is not sensitive to the technical, reliability and production problems peculiar to conventional systems.

SUMMARY AND OBJECTS OF THE INVENTION

The new and novel optical system departs from many existing conventions employed in current optical design. Like conventional optics design, optical materials and coatings are used to bend, filter and reflect light. Optical material is substituted instead of air to separate optical surfaces of refractive or reflective elements. This same optical material functions as a transmitting medium and as a means of integrating the various optical elements into a common and composite solid form. For example, instead of air separating the light source from the reflective surface of a spherical mirror, an optical material such as BK-7 would be substituted. This illuminator would now appear as a solid spherical segment having the light source contained within the solid form. The external spherical surfaces are coated with a highly reflective film to produce internal reflection of the light source. An additional protective film would be applied to protect the reflective film. Optical materials such as optical plastics, pyrex, fused silica, BK-7, silicon carbide, silicon, ZnSe, Ge and many others may be used in the construction of this new optical system. The optical index of refraction of the material can be selected to function as a heat removing filter. The integration of filter, light source and reflector result in a single optical component having only three optically finished surfaces requiring no mechanical alignment. Such a device is easily cast from a wide range of optical materials. The light source can also be integrated into the casting or installed later during the production process. It will be shown herein how this same design morphology is applied to other forms of air-spaced optical elements in order to create more efficient integrated solid optical devices.

A broad area of application is foreseen for this new optical system. There are a number of existing optical illumination systems used in products which can be vastly improved upon in terms of performance, reliability and reduce production cost through adaptation of this new system. However, a more significant market exists in the application of this new optical system in the creation of new products. Included are such products as high intensity illuminated safety vests, egress and entry signs, portable highway hazard signs, vehicle safety running lights, vehicle turn indicators, aircraft running lights, hand-held traffic control indicators, recreational garment lighting, underwater work illumination, sound activated display lighting, medical illumination devices, and solar powered work area illumination devices and are a few examples.

Therefore, it is among the primary objects of the present invention to provide a novel and efficient method of illumination through the use of moderate tolerance composite optical components.

Another object of the present invention is to provide an alternative method of producing useable light suitable for illuminating work areas.

Still another object of the present invention is to produce a novel and spectacular form of illumination suitable for use in entertainment.

Still a further object of the present invention is to employ the inherent high intensity light produced by the xenon flash lamp and neon lamp as a portable light source.

Yet another object of the present invention is to employ high intensity light in combination with suitable optical components to create an illumination system useful in safety devices.

Another object of the present invention is to produce an optical system which is free of individual air-spaced optical elements which are inter-dependent upon precise optical alignment.

Still a further object of the present invention is to provide a means of constructing composite optical devices which are the integration of individual optical components, for means for improving optical performance.

Other objects, together with the foregoing, are attained in the embodiments described in the following description and illustrated in the accompanying drawings.

BRIEF DESCRIPTION OF THE DRAWINGS

FIG. 5 comprising views A, B, C and D, is a view of the basic luminaire designs suitable for use with solid reflectors.

FIG. 6 is a cross-sectional view of solid optical reflector and flat optical grating luminaire.

FIG. 7 is a basic diagram for a solar light-collecting distribution system.

FIG. 8 is a basic diagram for the application of an arc-discharge lamp with a solid optical reflector.

DESCRIPTION OF THE PREFERRED EMBODIMENTS

Figure 1:
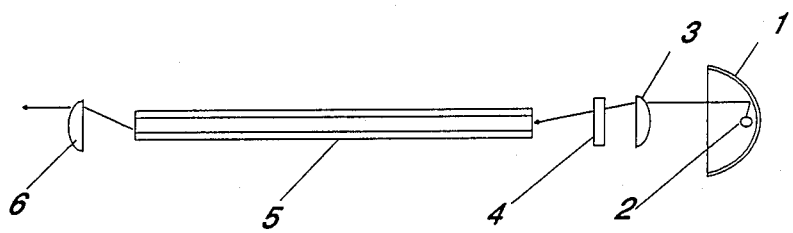
FIG. 1 is an example of prior art as applied to a basic conventional light collecting and light distribution system.

FIG. 1. is an example of prior art as applied to the construction of a typical arrangement of conventional optical components for the purpose of collecting radiant energy and transmitting it through a light pipe to a remote location where it may be applied to serve a purpose. A mirror lens 1 of either parabolic, elliptical or spherical geometry collects the radiant energy emitted by light source 2 and focuses the energy onto the surface of light pipe 5. The energy within the light pipe 5 is internally reflected and progressively travels along the pipe until it exits. Additional optical components such as refractive lens 3 and filters 4 may be interposed in the optical path to improve collection efficiency, remove heat and create monochromatic light. Still further, additional lens 6 may be placed at the exit end of the light pipe to control the dispersion of the emitted light. It is to be appreciated that further inclusion of lenses, filters and light pipes is practiced in efforts to improve transmission efficiency. Note that in such typical arrangement of conventional optical components each element is independent and possesses its own peculiar surface geometry. Still further, each element is inter-dependent upon the optical alignment of adjacent elements in order to operate. It is to be appreciated that each optical element exhibit two or more surfaces which must be optically finished to a precise geometry. It should be further appreciated that precise mechanical devices are further required to secure and align an aggregate of elements in order to perform a useful function.

Figure 2:
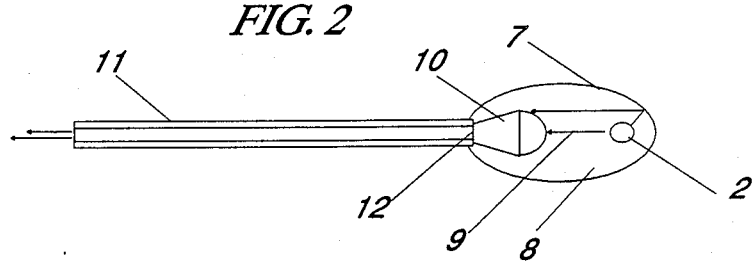
FIG. 2 is a cross-sectional view of a solid ellipsoid optical reflector, not including luminaire device.

FIG. 2. illustrates a solid ellipsoid optical reflector 7 (conic or cylindrical anamorphic) possessing characteristics analogous to a Mangin mirror (that is, combined reflecting and refracting), and differring only in that the entire conic section 7 is utilized to function like a condenser in a projection system. A light source 2, a point source device or a linear device such as a light emitting diode array or an electrical discharge lamp which is positioned along first focus point. The radiant energy emitted by light source 2, chromatic or monochromatic, impinges upon the reflective coating applied to the external surfaces of the elliptical solid 7 wherein it is reflected to the second focus point. The radiant energy emitted by the lamp 2 will undergo refraction through the optical material 8 comprising the elliptical solid 7. By selecting a suitable refractive index the material 8 can also function to focus undesired radiant energy 9 at a different focus plane. A cone channel condenser with integral lens 10 (conic or cylindrical anamorphic) having plane-inclined surfaces towards one another constructed of transparent optical material functions to concentrates radiant energy. Cone channel lens 10 may employ a plano convex or fresnel lens, of the same or different optical material. The walls of the cone channel section may be reflective coated or rely on total internal reflection to further concentrate the radiant energy upon the immersed section 12 of light pipe 11. Immersing the light pipe 11 within the cone channel lens 10 reduces the total internal reflections which may occur at the exit face of cone channel. The solid cone channel lens 10 effectively increases the acceptance angle of the light pipe 11 by a factor relative to the higher index material used.

Figure 3:
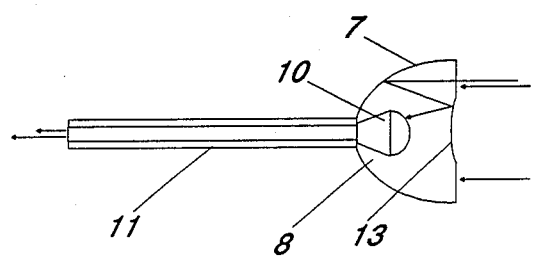
FIG. 3 is a cross-sectional view of a solid paraboloid or spherical reflector suitable for collecting or emitting light.

FIG. 3. illustrates a solid paraboloid or spherical optical reflector 7 constructed of optical material 8. Located at its focus point is a cone channel lens 10 whose energy discharge face is located at secondary aperture of optical reflector 7. Immersed into the discharge face of cone channel lens 10 is light pipe 11. Located at primary aperture of optical reflector 7 (primary mirror) is an integral back-coated (reflective film)

secondary mirror 13. Rays of radiant energy introduced into primary aperture are internally reflected by surfaces of reflector 7 and mirror 13 for means of concentrating radiant energy onto energy receiving face of cone channel lens 10 for further means of concentrating energy onto surface of light pipe 11. Light pipe 11 serves as a means of transmitting radiant energy to luminaire. The arrangement of optical components can also emit radiant energy from optical reflector by introducing rays of radiant energy into discharge face of light pipe.

Figure 4:
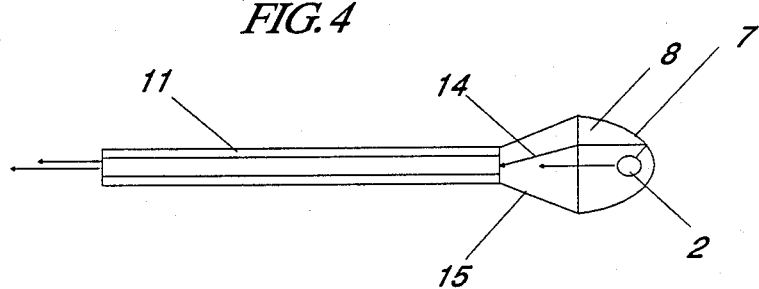
FIG. 4 is a cross-sectional view of a solid paraboloid or spherical reflector suitable for generating intense light, not including luminaire device.

FIG. 4. illustrates a solid paraboloid, ellipsoid or spherical reflector 7 (conic or cylindrical anamorphic) of optical material 8 and solid cone channel 5 of different optical material 14. Immersed into energy discharge face of cone channel 15 is light pipe 11. A suitable light source 2 for this configuration is a linear light emitting diode array or a electrical discharge lamp.

FIG. 5. views A,B,C, and D illustrate four luminaire configurations. All views of luminaires are cross-sectional and can be conic or cylindrical anamorphic in construction. View A is of a simple catadioptric reflector luminaire. Back-surfaced reflector 7 (primary mirror) of optical material 8 and secondary mirror 13 serve to collect and project radiant energy (located at focus point of reflector) introduced by light pipe 11. A diffusion film 16 is used to soften emitted light.

View B is of a simple back-surfaced cylindrical reflector 7 of optical material 8 and wherein light is introduced along reflector focus plane by light pipe 11. A diffusion film 16 is used to soften emitted light.

View C is of a prism and lens combination luminaire. The combination of lens 18, prism 17 combined to form a narrow beam luminaire. The combination of lens 18, prism 17 and reflective coating 7 serve to fold the light at a right angle from the discharge face of light pipe 11 which is located at the focus point of lens 18.

View D is a view of an altered form of echelon grating wherein steps 19 are positioned 45 degrees so as to reflect light introduced by a light pipe 11. The reflective grating 19 resembles a flight of stairs possessing a highly reflective surface where upon light impinging these steps, introduced by light pipe 11 and collimated by lens 18 is reflected out of the luminaire, in the preferred embodiment the light source would be at least one fiber optics cable and a cylindrical lens 18 would be employed. The width and length of the reflective grating 19 could be selected so as to accommodate any desired number of fiber optics light sources. It is to be appreciated further, that the grating may be constructed in numerous shapes so as to suit any number of possible applications.

FIG.6 illustrates a cross-sectional view of a solid cylindrical anamorphic shaped reflector 7 (see FIG. 13. for top view), linear light source 2 and wedge like cone channel 15. Immersed into discharge face of cone channel 15 is a flat light pipe 11 (of any desired shape) having one surface composed of reflective grating 20. Light generated by solid cylindrical reflector is introduced into light pipe 11 wherein light impinging upon reflective grating is reflected out from surface opposite reflective grating 20 in a generally dispersed manner. A transparency 37 may be attached to the light emitting surface for means of illuminating transparency.

FIG. 7 illustrates the basic diagram of this new optical system as it may be arranged for means of collecting, transmitting and emitting of solar generated light. Such a system would be comprised of at least one solid optical reflector 22 (conic or cylindrical anamorphic) of either spherical, parabolic or elliptical design. Solid optical reflector 22 would be of a design as presented in FIG. 3. Solar light collected by reflector 22 would be transmitted by at least one flexible light pipe 11 to the desired termination point and wherein discharge face of light pipe would be coupled to luminaire 23.

FIG. 8 illustrates the basic diagram of this new optical system as it may be arranged for means of generating, transmitting and emitting continuous or pulsating light. Such a system would be comprised of at least one solid optical reflector 7 (conic or cylindrical anamorphic) of either spherical, parabolic or elliptical design. Solid optical reflector 7 would be of designs presented in FIG. 2 and FIG. 4. Light generated by reflector 7 would be transmitted by at least one flexible light pipe 11 and terminated in a suitable luminaire 23. Light source 2 which could be either an electrical discharge lamp or a light emitting semiconductor device. Electrical energy for powering the light source 2 could be provided by a fixed or portable source 24.

FIGS. 9, 10, 11, and 12 are views illustrating methods of incorporating this new optical system into various forms of substratum. The solid optical reflector 24 represents any one of the optical designs presented in FIGS. 2,3, and 4.

Figure 9:
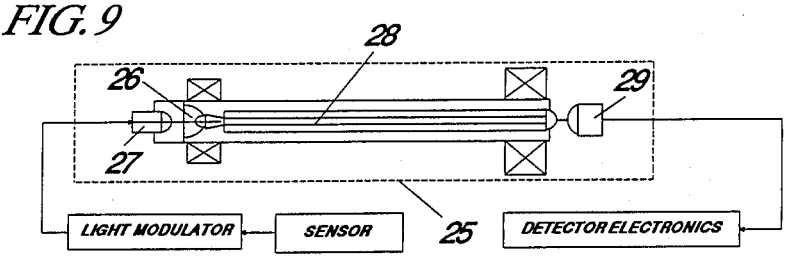
FIG. 9 is a basic diagram of the new optical system employed in an engine health monitoring design.

In FIG. 9 the optical system 26 is coaxially located within a power shaft 28 of engine system 25. Its purpose is to serve as the communications link between a sensor modulated external light source 27 and detector 29. Such an embodiment is applicable to the health monitoring of engine systems.

Figure 10:
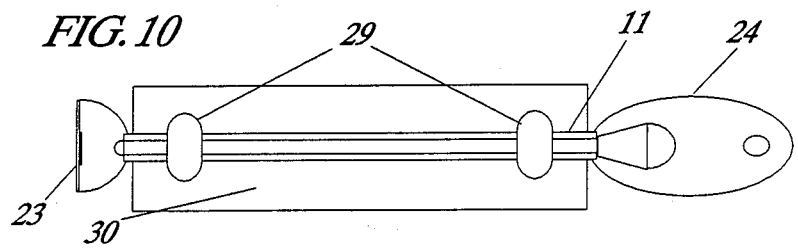
FIG. 10 illustrates a method for securing light pipes to a garment base.

In FIG. 10 the optical system comprised of at least one luminaire 23, a flexible light pipe 11 and a light generating solid reflector 24 can be externally attached to a flexible material 30, such as a garment, by means of Velcro fasteners 29 for means of providing secure attachment and easy removal.

Figure 11:
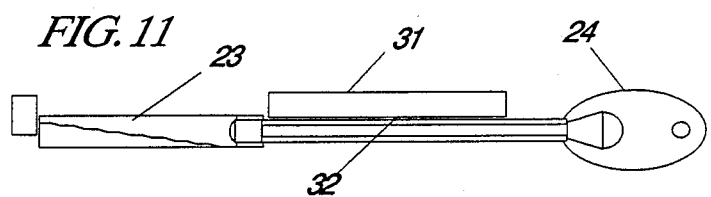
FIG. 11 illustrates a method for securing light pipes and luminaires to a flooring material.

In FIG. 11 the optical system comprising at least one luminaire 23, a flexible light pipe 11 and light generating solid reflector 24 can be structurally bonded to the underside 32 of flexible or rigid flooring 31 in a manner as to allow the luminaire 23 to be integrated into the actual flooring material.

Figure 12:
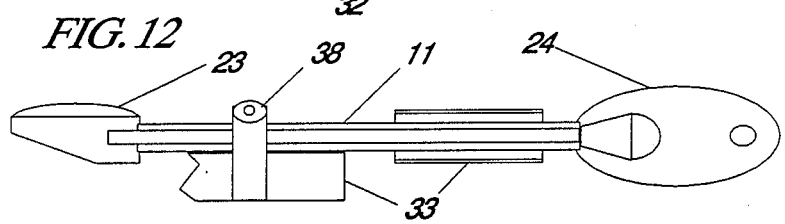
FIG. 12 illustrates a method for securing light pipes to a rigid structure.

In FIG. 12 the optical system comprised of at least one luminaire 23, a flexible light pipe 11 and a light generating solid reflector 24 can be mechanically attached using clamps 38 to conduit pipe 33 or it may be routed internally along with electrical conductors.

Figure 13:
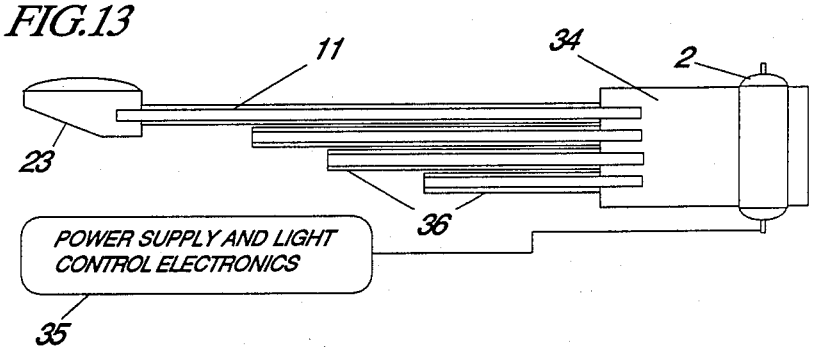
FIG. 13 is a basic diagram of a linear arc-discharge lamp and multiple light pipes used with a solid cylindrical optical system.

FIG. 13 illustrates a diagram of the new optical system wherein a pulsed xenon flash lamp 2 is used to generate intense light and employs a solid reflector 34 coupled to any desired number of light pipes 11 or any number of light pipes 11 housed in a single cable 36. The design of the solid reflector 34 could be that presented in either FIG. 2 or FIG. 4. Depending upon applications wherein a fixed or portable illumination system is selected, the operation of the circuits would be as follows. Power supply and control electronics 35 can be either ac operated or battery operated. Power supply would generate greater than 350 volts dc which would charge one or more capacitors so as to form the power pulse generator. The charged capacitors are connected across the xenon lamp 2. A trigger pulse generator, either a free-running pulse generator or a random pulse generator controlled by an external transducer is employed to energize lamp. The random pulse being generated only upon a signal generated by the external transducer which may be energized by sound, light, pressure or some other selected parameter. The generated trigger pulse is then applied to a lamp trigger circuit wherein a high voltage pulse is generated and applied to the xenon lamp and therein causing ionization of the xenon gas which provides a discharge path for the electrical energy stored in the capacitors resulting in the subsequent generation of intense light.

What is claimed is:

1. An optical device for radiant energy transmission comprising, in combination:
   a source of energy,
   a means for directing energy from said energy source to a light pipe including a solid mass of optical material which collects and directs the energy, reflective means circumscribing at least a portion of said optical material for focusing the energy, a lens means interposed between said optical material and said light pipe,
   and a luminaire at an end of said light pipe material remote from said energy source to display the energy transmitted wherein said light pipe has a proximal end immersed into said lens means to improve energy transfer therebetween, defined by said proximal end placed within said lens means and dimensioned to tightly engage said proximal end.

2. The device of claim 1 wherein said optical material tangentially abuts against at least a portion of said lens.

3. The device of claim 1 wherein said luminaire includes a recess to receive a distal end of said light pipe, optical material disposed within said luminaire and receiving said energy from said, lightpipe and
   reflective means on said luminaire to direct said energy and an output area to exhibit said energy.

4. The device of claim 3 wherein said luminaire is in the form of a echelon grating wherein said reflective means are carried on stairs of said grating.

5. The device of claim 3 wherein said luminaire includes a diffusion film at said output area to soften the emitted energy.

6. The device of claim 3 wherein said lens means is a focusing lens on a principal optical axis to further concentrate the energy radiation.

7. The optical device of claim 1 wherein said energy source is an arc discharge lamp.

8. The device of claim 1 wherein said energy is directed to said light pipe which is located along a longitudinal axis of a hollow shaft and said luminaire directs energy at an end of said light pipe remote from said source and to a detector.

9. The device of claim 1 wherein said luminaire is placed within a void adjacent an area of textile material.

10. The device of claim 1 wherein said fiber optic cable is supported on a substrate of textile material.

11. The device of claim 1 wherein said energy source is a xenon lamp and said directing means communicates with a plurality of fiber optic cables to distribute energy from the lamp to several locations.

12. An integrated optical device comprising in combination: a source of energy,
    energy directing means including light pipe having a proximal end embedded in a solid mass of optical material and a distal end embedded in a luminaire, said luminaire displaying said energy.

13. An optical device for radiant energy transmission comprising, in combination:
    a source of energy,
    a means for directing energy from said energy source to a light pipe including a solid mass of optical material which alters collects and directs the energy, reflective means circumscribing at least a portion of said optical material to for focusing the energy, a lens means interposed between said optical material and said light pipe,
    and a luminaire at an end of said light pipe material remote from said energy source to display the energy transmitted wherein said luminaire includes a recess to receive a distal end of said light pipe, optical material contained disposed within said luminaire and receiving said energy from said lightpipe, and reflective means on said luminaire to direct said energy and an output area to exhibit said energy wherein said luminaire is in the form of a echelon grating wherein said reflective means are carried on stairs of said grating.

14. An optical device for radiant energy transmission comprising, in combination:
    a source of energy,
    a means for directing energy from said energy source to a light pipe including a solid mass of optical material which alters collects and directs the energy, reflective means circumscribing at least a portion of said optical material to for focusing the energy, a lens means interposed between said optical material and said light pipe, wherein said light pipe is supported on a substrate of textile material.

15. A method for forming an optical device as an integral cast system, the steps including:
    embedding one end of a light pipe into a mass of solid, optical, energy transmissive material, and embedding another end of the light pipe into a solid, optical luminaire, whereby the device thus formed has permanently fixed and precise alignment of the luminaire, light pipe and mass of solid optical material and interfaces along areas of embedment are optically transparent.

16. The method of claim 16 including forming the mass of solid, optical energy transmissive material with a lens integrally cast therewithin.

17. The method of claim 17 including coating an outer surface of the mass of solid optical energy transmissive material with a reflective film to produce internal light reflection within the mass.

18. The method of claim 18 including integrally forming a plurality of reflective surfaces within the solid optical luminaire.

19. A method for efficiently emitting energy at a site remote from its origin including the steps of,
    emitting the energy including reflecting through a mass of solid optical material,
    focusing the energy through a lens embedded in the optical material,
    emitting the energy into a light pipe embedded in the lens,
    displaying the energy delivered through the light pipe to a luminaire connected to the light pipe.

20. The method of claim 19 including reflecting the energy in the luminaire.

21. The method of claim 20 including reflecting the luminaire energy by directing the energy on a surface,
    providing the surface with a large number of grooves defining a grating,
    such that energy falling thereon is dispersed into a series of spectra.

22. The method of claim 21 including placing a transparency in the path of the dispersed energy.

23. The method of claim 20 including collimating the energy in the luminaire, and displaying the energy on an echelon type grating whereby energy impinging thereon is deflected to the display.

* * * * *